(12) United States Patent
Richards

(10) Patent No.: US 10,822,994 B2
(45) Date of Patent: Nov. 3, 2020

(54) TURBINE OF A TURBOCOMPOUND ENGINE WITH VARIABLE LOAD AND A CONTROLLER THEREOF

(71) Applicant: Aeristech Limited, Warwickshire (GB)

(72) Inventor: Bryn Geoffrey Roddick Richards, Warwickshire (GB)

(73) Assignee: Aeristech Limited, Warwickshire (GB)

( * ) Notice: Subject to any disclaimer, the term of this patent is extended or adjusted under 35 U.S.C. 154(b) by 0 days.

(21) Appl. No.: 14/775,377

(22) PCT Filed: Mar. 4, 2014

(86) PCT No.: PCT/GB2014/050631
§ 371 (c)(1),
(2) Date: Sep. 11, 2015

(87) PCT Pub. No.: WO2014/140529
PCT Pub. Date: Sep. 18, 2014

(65) Prior Publication Data
US 2016/0024961 A1    Jan. 28, 2016

(30) Foreign Application Priority Data

Mar. 15, 2013    (GB) .................................. 1304763.4

(51) Int. Cl.
*F01D 21/00*    (2006.01)
*F02B 41/10*    (2006.01)
(Continued)

(52) U.S. Cl.
CPC ............. *F01D 21/003* (2013.01); *F01D 5/02* (2013.01); *F01D 15/10* (2013.01); *F01D 21/006* (2013.01);
(Continued)

(58) Field of Classification Search
CPC ...... F01D 15/10; F01D 21/003; F01D 21/006; F01D 25/24; F01D 5/02; F02B 41/10;
(Continued)

(56) References Cited

U.S. PATENT DOCUMENTS

| | | | |
|---|---|---|---|
| 7,174,714 B2 | 2/2007 | Algrain | |
| 7,478,533 B2 * | 1/2009 | Ueno | F02B 37/004 290/52 |

(Continued)

FOREIGN PATENT DOCUMENTS

| | | |
|---|---|---|
| EP | 2500530 A1 | 9/2012 |
| GB | 2444603 A | 6/2008 |

(Continued)

OTHER PUBLICATIONS

International Preliminary Report on Patentability in PCT/GB2014/050631, dated Sep. 15, 2015.

(Continued)

*Primary Examiner* — Thai Ba Trieu
*Assistant Examiner* — Dapinder Singh
(74) *Attorney, Agent, or Firm* — Levenfeld Pearlstein, LLC

(57) ABSTRACT

A turbine of a turbocompound engine (10) for extracting energy from the exhaust fluid flow of an and a controller (40) thereof is described. The turbine (10) comprises a housing (30); a turbine wheel (12) rotatably coupled within the housing (30) and rotatable by a fluid flow to provide a rotational output (14); a variable load (34) applying a load to the rotational output; and a controller (40). The controller (40) is configured to: receive information (404) relating to the operating conditions of the turbine (10); calculate an optimum operating velocity (402) of the rotational output based on the operating conditions; and supply a signal (410) to the variable load (34) to vary the load applied to the (Continued)

rotational output (14) in response to said operating conditions so that the rotational output (14) rotates at a corrected operating velocity (408). Such an arrangement increases the ability to operate the turbine at its optimum operating velocity.

17 Claims, 8 Drawing Sheets

(51) Int. Cl.
*F01D 5/02* (2006.01)
*F01D 15/10* (2006.01)
*F01D 25/24* (2006.01)
*F02B 37/00* (2006.01)

(52) U.S. Cl.
CPC .............. *F01D 25/24* (2013.01); *F02B 41/10* (2013.01); *F02B 37/005* (2013.01); *F05D 2220/30* (2013.01); *F05D 2220/40* (2013.01); *F05D 2220/76* (2013.01); *F05D 2240/24* (2013.01); *F05D 2270/02* (2013.01); *F05D 2270/03* (2013.01); *F05D 2270/20* (2013.01); *F05D 2270/304* (2013.01); *F05D 2270/44* (2013.01); *F05D 2270/54* (2013.01); *Y02T 10/163* (2013.01)

(58) Field of Classification Search
CPC .... F02B 37/005; F02B 37/013; F02B 37/183; F02B 37/18; F02B 37/004; F05D 2220/30; F05D 2220/40; F05D 2220/76; F05D 2270/03; F05D 2270/20; F05D 2270/304; F05D 2270/44; F05D 2270/54; Y02T 10/144; Y02T 10/163
USPC ....... 60/602, 605.2, 608, 624; 290/52, 40 C; 318/157, 158
See application file for complete search history.

(56) References Cited

U.S. PATENT DOCUMENTS

| | | | |
|---|---|---|---|
| 7,628,015 B2 * | 12/2009 | Marumoto | F02B 33/34 60/607 |
| 7,866,157 B2 | 1/2011 | Ernst et al. | |
| 8,141,360 B1 * | 3/2012 | Huber | B60K 6/24 290/40 B |
| 8,143,732 B2 * | 3/2012 | Algrain | F02B 37/10 290/1 A |
| 2012/0297770 A1 | 11/2012 | Figler et al. | |

FOREIGN PATENT DOCUMENTS

| | | |
|---|---|---|
| WO | 2011023282 A1 | 3/2011 |
| WO | 2011058832 A1 | 5/2011 |
| WO | 2011161408 A2 | 12/2011 |

OTHER PUBLICATIONS

International Search Report in PCT/GB2014/050631, dated Aug. 8, 2014.

* cited by examiner

TURBINE OF A TURBOCOMPOUND ENGINE WITH VARIABLE LOAD AND A CONTROLLER THEREOF

The present invention relates to a turbine, a forced induction system incorporating such a turbine and to a controller thereof. Particularly, but not exclusively, the invention relates to a turbine with a controller that provides suitable control over the turbine's load and to a controller for adjusting the speed of a turbine to provide the same. Such a turbine is ideally suited for use in turbocompounding such as a forced induction system.

The concept of turbocompounding is well documented, and many arrangements are known. In its various forms, turbocompounding involves a turbomachine (turbine) that restricts exhaust gas flow from an engine in order to extract power, and then the delivery of this power to some useful purpose. Typically, power will be delivered to the crankshaft of the engine by means of mechanical, hydraulic, or electrical connection. WO2011023282A1 provides a good example of a mechanical system, and U.S. Pat. No. 7,174,714B2 provides a good example of an electrical system. In the case of an electrical system, the power is often delivered to a battery or an ancillary electric load, rather than the crankshaft. A typical application is a static or mobile piston engine with a reasonably steady duty cycle requirement, although the concept also applies to other engines, such as gas turbines.

In some cases, turbocompounding can refer to a separate engine (an additional thermodynamic cycle) converting waste heat energy (from the main engine) to useful work. Examples are described in U.S. Pat. No. 7,866,157B2 and WO2011058832A1. Such systems will typically place a heat exchanger in the exhaust manifold of an engine, transfer waste heat to another working fluid, and then pass that working fluid through a turbine.

Normally, without a controlled, variable load, a turbine is known to operate at one particular speed for any given quantity of available input power. The turbine behaves this way because it is normally loaded by a compressor, and the turbine naturally finds an operating speed where turbine power is balanced by compressor load. Therefore, turbine manufacturers will typically quote an operating 'line' that achieves this balance with a particular, specified compressor. For example, the turbine will be quoted as providing a particular efficiency for any given U/C (nondimentionalised inlet gas velocity (turbine blade tangential velocity (U) and ideal velocity (C))) expansion ratio or a particular pressure drop for any given quantity of mass flow. In fact, these operating 'lines' are artificial; with a controlled, variable load, the turbine is capable of operating with an additional degree of freedom. This produces a 'map' of potential operating states, in which a control strategy can influence and adjust the relationship between efficiency and U/C or between pressure drop and mass flow. To reiterate: the turbine's operating map is generally known and understood by experts, but it has limited relevance in turbocharger applications, because of a lack of control over the turbine. Instead, an operating line, reflecting the characteristics of the turbine's load, is a more relevant construct.

Now we consider turbine efficiency, where turbine speed is an independent variable. Engine designers, aftermarket tuners, and other direct users of turbochargers will think of the turbine's efficiency as following an inverted parabolic shape when plotted against U/C. But it will be known to designers that the turbine's theoretical behaviour is a family of parabolic curves, where each curve represents a particular turbine speed, as shown in FIG. 2.

The standard load for a turbocharger is a turbocompressor defined as a compressor of the turbomachine type, being not a positive displacement device. The characteristic of a turbocompressor is to consume power at a rate proportional to the square of its rotational speed. Without an external control, the compressor load plus losses must consume all of the available turbine power. Or alternatively, the turbine's power must exactly match the load, plus any additional energy consumed or restored by changing the rotational kinetic energy of the turbine compressor shaft. Thus, the system will "float" to an operating speed whereby the compressor input power and turbine power (minus losses) match. This speed is almost always not at the optimal turbine efficiency point for the available input power.

One attempt to mitigate these problems is Variable Vane Geometry (typically called VGT systems—Variable Geometry Turbine). This system allows the incident angle of the exhaust gas impinging upon the turbine to be adjusted. The optimal operating speed of the turbine is then a function of vane position. Although VGT systems entail some additional losses, the overall effect is a broader range of optimal (more accurately, near-optimal) turbine speeds.

VGT has limitations. In practice, VGT systems rarely operate as a continuum. Instead, they allow the selection of two or more geometries, allowing two or more near-optimal turbine speeds. This improves turbocharger efficiency at lower expansion ratios, but not to the extent that would be possible with adjustable control of turbine load. Additionally, the VGT hardware itself blocks the flow of gas and makes the turbine less efficient. Furthermore, when the VGT is moved from its wide-open position, it blocks the flow of gas still further. Although it redirects the flow effectively, the flow path of the redirected gas is usually much less smooth and straight than the wide-open flow path. This further reduces efficiency, so VGT is only ever used within a very narrow band of movement. Finally, VGT systems often have to operate in a hostile environment, and it is not normally feasible to provide continuous control. Instead, VGT systems often operate either wide-open or not-wide-open, with little or no control in between. Variable Vane Geometry is complimentary to, and also a partial alternative to, the solutions described herebelow.

The above discussion shows that a turbine is most efficient when allowed to operate at its design speed, but that this happens in practice only within narrow limits of operation. Thus, turbines, particularly when used in transient applications, are rarely operating with optimal efficiency. While there are ways to extend the range of acceptable operation, the fundamental problem is a lack of control over the turbine's load, causing speed and power to be connected in an undesirable way.

SUMMARY OF THE INVENTION

The present invention aims to alleviate the above issues by providing a turbine with a controller that provides suitable control over the turbines load. There is also provided a forced induction system or a turbocompound system using such a turbine and a controller for adjusting the load and speed of a turbine to optimise or otherwise to select its efficiency.

According to a first aspect of the present invention there is provided a turbine for extracting energy from a fluid flow, the turbine comprising: a housing; a turbine wheel rotatably coupled within the housing and rotatable by a fluid flow to provide a rotational output; a variable load applying a load to the rotational output; and a controller configured to: receive information relating to the operating conditions of the turbine; calculate the optimum operating velocity of the rotational output based on the operating conditions; and supply a signal to the variable load to vary the load applied to the rotational output in response to said operating conditions so that the rotational output rotates at a corrected operating velocity.

The goal of the controller is to influence the optimum operating efficiency of the turbine, often to increase its operating efficiency and sometimes to reduce it. Increasing the operating efficiency of the turbine can lead to better performance of a turbocharger (supplying additional compressed air to the engine and/or overcoming turbo lag more rapidly). Alternatively or in addition, increased turbine efficiency can lead to surplus power, to be extracted from the turbine for the purpose of turbocompounding. In the case of reduced operating efficiency, this can be used to achieve a part-load engine operating state or to avoid overcharging a battery or other storage device when an undesirable amount of excess power is available. Such a scenario may be desirable, for example, when the engine is cold (cold engine oil).

An advantage of this arrangement is that the turbine operating speed can be optimised to maximise the efficiency of the turbine at the detected current operating conditions. At low expansion ratios, such as during warm-up of the turbine, the speed of the turbine can be reduced by reducing the load applied to the rotational output.

Generally, the rotational output of the turbine wheel is provided to a turbine shaft, to which the turbine wheel is connected.

In a particular embodiment, the variable load of the turbine acts to accelerate the rotational output. This may be achieved by applying a negative current to the load such that the load acts a motor. This helps to quickly bring the rotational output to its optimum speed during warm-up, allowing the turbine to enter more quickly an operating regime in which its efficiency is high.

Alternatively, embodiments allow the variable load to act to as a brake for the rotational output. This can ensure that the rotational speed of the turbine does not exceed the optimum design speed of the turbine where efficiency is greatest, thus preventing the turbine from being damaged by over-speed. For the designer of the turbine, the knowledge that it can be used in conjunction with a device capable of limiting its speed to the intended operating range offers additional design flexibility. For example, the designer is freed from the responsibility of incorporating efficiency limiting devices that act upon the turbine at or near its intended maximum operating speed. Examples of efficiency limiting devices include waste gates, which are generally designed to open slightly and to waste excess power before the turbine reaches its maximum speed, to prevent over speed with a safety margin. Other examples include modifications to blade design that reduce top-speed efficiency, the operating region where the efficiency should be highest, to reflect the fact that at top speed the turbine is in steady state and requires less power than it did at lower speeds when it was still accelerating. By utilising a controller that can place the turbine at its optimal operating speed, by removing the need for such efficiency limiting devices, the designer is free to improve and optimise the turbine design for the greatest possible efficiency at all speeds and particularly at top speed.

In embodiments, the variable load is applied to the rotational output by an electric machine.

Generally, the controller uses an analyser, for example a lookup table, with interpolation or else a mathematical relationship derived from theory or experimentation to calculate the optimum operating velocity of the rotational output based on the operating conditions of the turbine. Generally, the controller can use a PID controller or a sliding mode, state-space, or other architecture to compare the corrected operating velocity to the optimum operating velocity and to apply a correction signal if the corrected operating velocity is not equal to the optimum operating velocity, thereby to ensure that the turbine remains at the optimal operating speed during the highest possible proportion of its operating life.

In preferred embodiments, the information relating to the operating conditions of the turbine includes the current expansion ratio of the turbine. The current expansion ratio of the turbine can be measured by pressure sensors within the fluid flow.

Embodiments of the invention require that the information relating to the operating conditions of the turbine include the current speed of the rotational output and/or the current torque of the rotational output.

Where the variable load applied to the rotational output is an electric machine, the electric machine is generally a generator. In such embodiments, the variable load can be the generator current that corresponds to the desired load torque of the rotational output. The generator can be a synchronous generator. Additionally, the controller can include a secondary controller (i.e. an embedded loop) to receive information of the value of the generator current and to calculate the actual torque of the rotational output from the value of the generator current. Furthermore, the controller can receive the calculated actual turbine torque and utilise a torque lookup table or other calculation to calculate the optimum rotational speed and the value required for the variable load torque load so that the rotational output rotates at the corrected rotational speed.

This secondary or embedded controller can enable a precise targeting of speed and the introduction of internal limits (for example, to prevent over-speed). The outer/main controller can calculate a desired target speed based on a target operating state or efficiency level. The secondary/embedded controller can use the main controller's output as its input, calculating a desired target load to apply to the turbine to achieve the specified target speed. Between the two controllers, nonlinearities such as speed limits may be applied and/or controller status may be monitored by an independent system such as a software module designed to predict service intervals.

According to a second aspect of the present invention there is provided a forced induction system for an engine, the system comprising: a compressor for increasing the pressure of gas into the engine; a turbine as defined above and an electric motor arranged to drive the compressor.

Advantageously, the compressor and turbine can be mechanically decoupled. This allows the turbine to be completely controlled by varying the value of the variable load applied to the rotational output.

According to a third aspect of the present invention, there is provided a controller for adjusting the speed of a turbine, the controller comprising: an input to receive information relating to the current operating conditions of a turbine; an analyser to calculate the optimum rotational speed of the turbine based on the information received by the input; and an output configured to supply a correction signal to the turbine, wherein the correction signal alters the load applied to the turbine to increase or decrease the rotational speed of the turbine to match the optimum rotational speed.

In embodiments, the load applied to the turbine is applied by a generator.

In further embodiments the information relating to the current operating conditions of the turbine is the expansion ratio of the turbine.

Where the load applied to the turbine is applied by a generator, the information relating to the current operating conditions of the turbine can be the value of the number of amps flowing through the generator and the voltage across the generator.

Preferably, the controller uses a lookup table to calculate the correction signal based on the information received by the input. The controller may use a PID, sliding mode, state space, or other controller to monitor the correction signal. The analyser may also use a lookup table to calculate the optimum rotational speed of the turbine.

The methodology is relevant to steady loads and, unusually, to unsteady loads as well. The greatest benefit of this invention will be seen in situations where an engine that is subjected to unsteady operation is fitted with a turbocompound. This will include engines that are subjected to inconstant speed (including vehicle engines), inconstant ambient conditions (including aviation engines subjected to changing altitude), and/or inconstant torque (including load levelling or backup power engines). This document applies particularly to electric turbocompounding, although a skilled person will be able to apply some of the principles to hydraulic and clutched/geared systems.

Given the above outlined benefits of controlling turbine speed, the present invention proposes a turbine with an improved controller, a forced induction system utilising such a turbine and a controller able to adjust the speed of a turbine to improve turbine efficiency.

BRIEF DESCRIPTION OF THE DRAWINGS

Particular embodiments of the invention are illustrated in the accompanying drawings, in which:

FIG. 1 shows a turbine 10 for extracting energy from a fluid flow and converting this energy into useful work. Such turbines 10 are typically used in forced induction systems, such as turbochargers. The turbine 10 comprises a turbine wheel 12 connected to a turbine shaft 14. The turbine 10 also has a gas inlet 16 to which is connected the exhaust 18 of an engine 20 via ducting 22 or the like in a conventional manner, such that the flow of combustion gasses exiting the cylinders of the engine drive the turbine 10.

Figure 1:
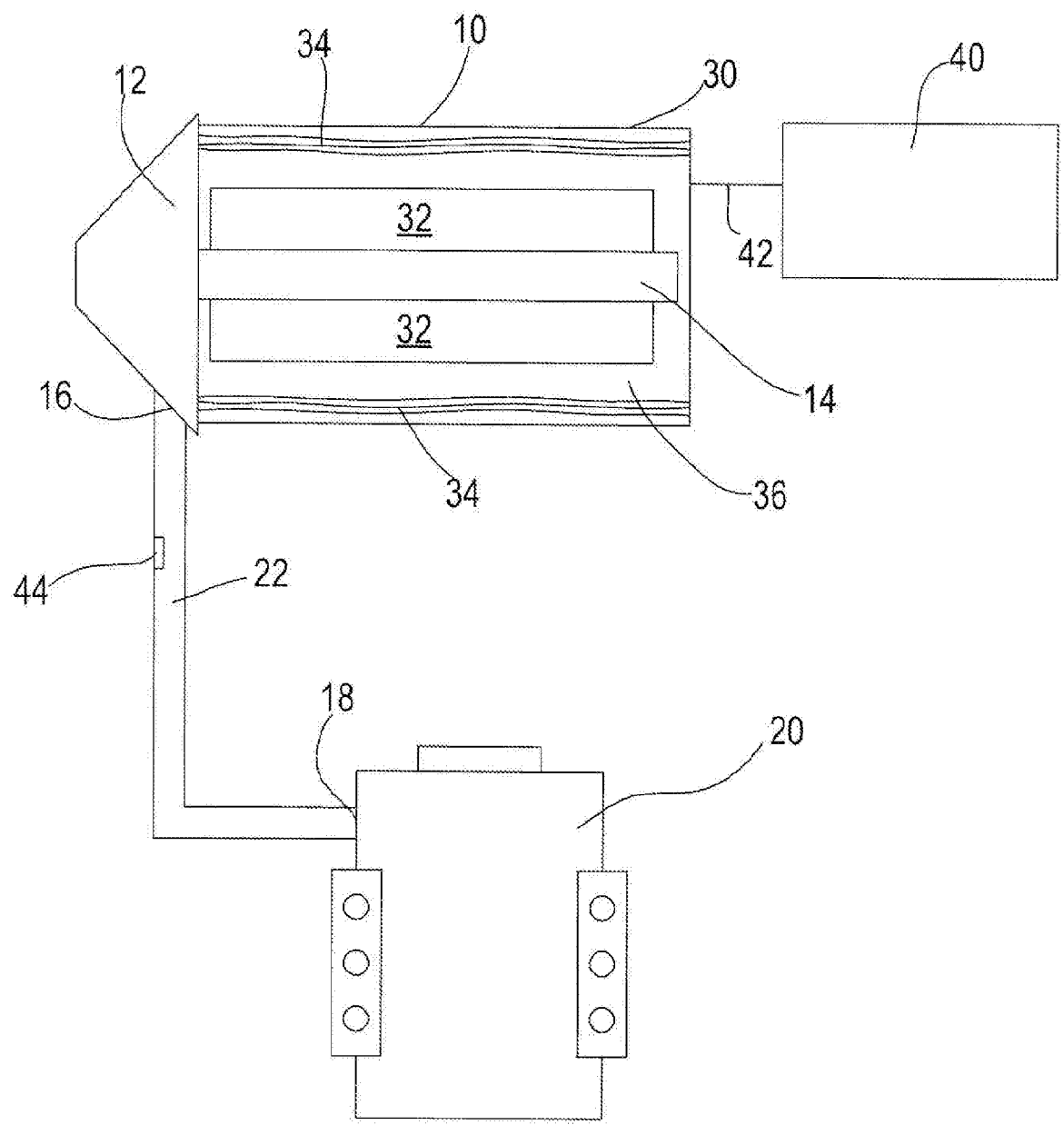
FIG. 1 is a schematic representation of a turbine according to the present invention and a turbine suitable for use with the controller of the present invention, where the turbine is shown in sectional view to allow internal components to be identified.

A housing 30 surrounds the turbine shaft 14. Arranged about and coupled to the turbine shaft 14 are a series of permanent magnets 32. In the example shown, the magnets 32 form a continuous ring around the turbine shaft 14, however it will be appreciated that the ring may be discontinuous depending on the required application of the turbine. The magnets 32 are typically 4 pole NdFeB permanent magnets.

Surrounding the magnets 32 are a plurality of electrical windings 34. The electrical windings 34 are typically disposed within slots that surround the turbine shaft 14 and the permanent magnets 32. Example arrangements of the electrical windings 34 relative to the magnets and rotor may be found in applicant's co-pending patent application WO2011161408. The electrical windings 34 and the magnets surrounding the turbine shaft 14 act as a synchronous generator 36 (alternatively called an alternator or a magneto) that harnesses energy from the rotational speed of the turbine shaft 14. In effect, the turbine shaft 14 acts as the rotor of the generator 36, whilst the electrical windings 34 act as the stator. Alternatively, by energising the electrical windings 34 in a complimentary manner, such as with positive current, the magnets 32 and windings 34 act as a motor, acting on the turbine shaft 14. The precise orientation and arrangement of the magnets is not crucial for the present invention.

When no electrical current is flowing through the windings 34, the magnets 32 act as a load against the rotation of the turbine shaft 14 (via Lenz's law). This is the intrinsic load of the synchronous generator 36. This load is a function of the rotational speed of the turbine 10, or more accurately, the torque generated by the turbine shaft 14.

The intrinsic load of the generator 36 is also dependent on the field strength of the magnets 32 and the windings 34.

A controller 40 is electrically connected to the turbine 10 by an electrical connection 42. The controller 40 will be described in greater detail below with reference to FIG. 5.

Conventionally, the load on the turbine 10 is an aerodynamic load (such as the input air from a compressor). However, where there is no direct link between the compressor and the turbine 10 (for example in a fully electric turbocharger), this constraint no longer exists. Therefore, it is possible to apply a defined load tailored to the required operating speed and/or torque of the turbine 10.

Figure 2:
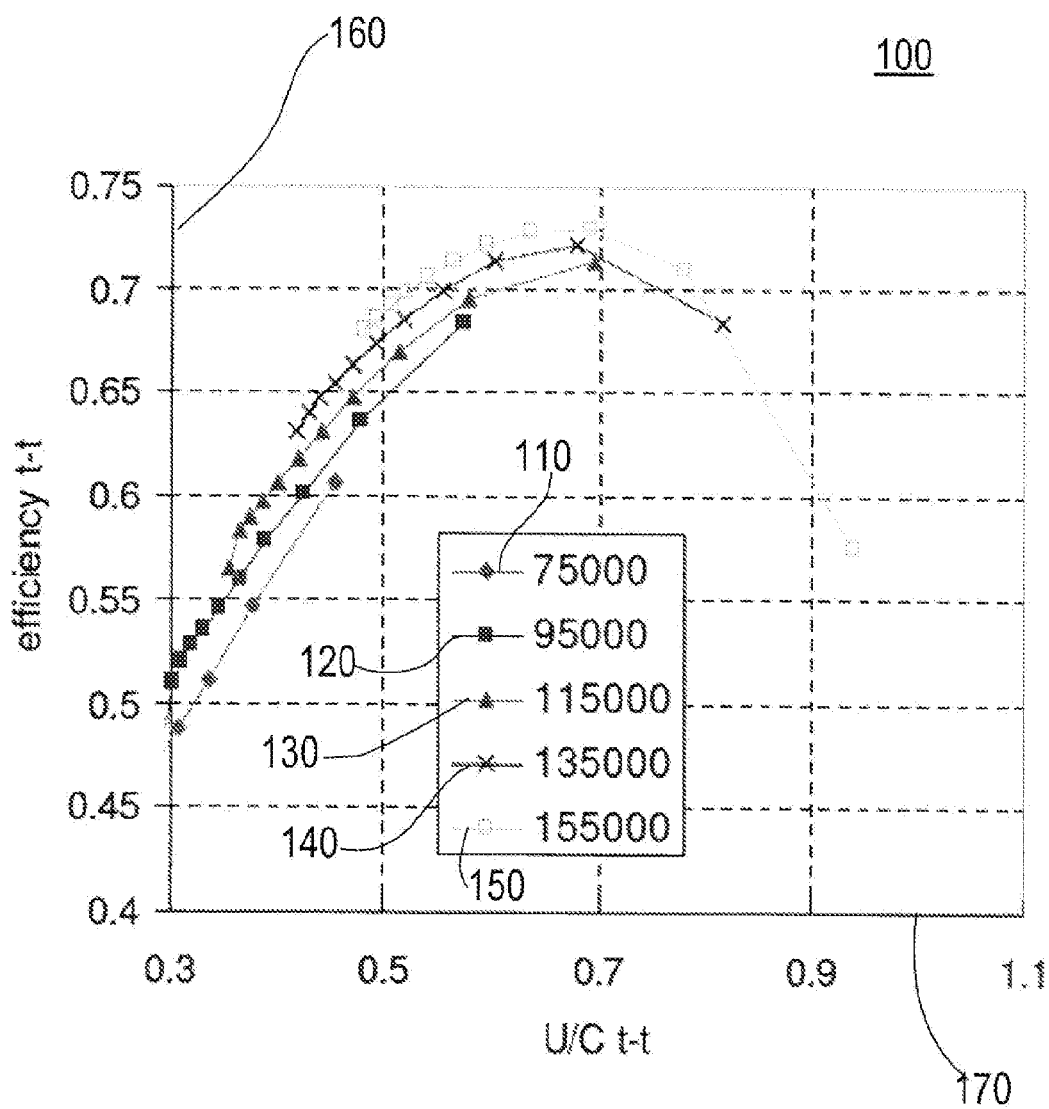
FIG. 2 is a graph of Efficiency vs U/C in a hypothetical known turbine design.

FIG. 2 is a graph 100 that shows a series of curves 110-150 representing the efficiency of a turbine (y-axis 160) as a function of the tip speed ratio of the turbine (U/C) (x-axis 170) at various operating speeds. The tip speed ratio is the rotational speed of the turbine compared to the speed of the gas flowing over the blades. Broadly, FIG. 2 shows the efficiency of a turbine increasing with increased turbine speed.

Normally, the speed of the turbine is not an independent variable—it is a function of the turbine's output shaft torque, and thus a function of U/C. Therefore, the inverted parabolas shown in FIG. 1 are amalgamated into a single parabola that traces the turbine's behaviour with varying power (U/C and speed changing together). To plot turbine efficiency with turbine speed as an independent variable, as in FIG. 2, is conventionally viewed as a theoretical exercise; the data are difficult to obtain experimentally and have limited relevance to engine design, due to the lack of turbine speed control.

From FIG. 2, it can be seen that the efficiency of the turbine is better with higher speeds. In fact, the performance of the turbine is optimal at the design speed (which in FIG. 2 is 155000 RPM, but in general can be any speed). Beyond the design speed of the turbine, efficiency drops away. The axiom that performance and efficiency are best at the design speed holds true except at very low expansion ratios (the ratio of the incident or inlet pressure of the exhaust gas as it enters the turbine to the output or outlet pressure of the exhaust gas as it leaves the turbine). This is illustrated by FIG. 3.

Figure 3:
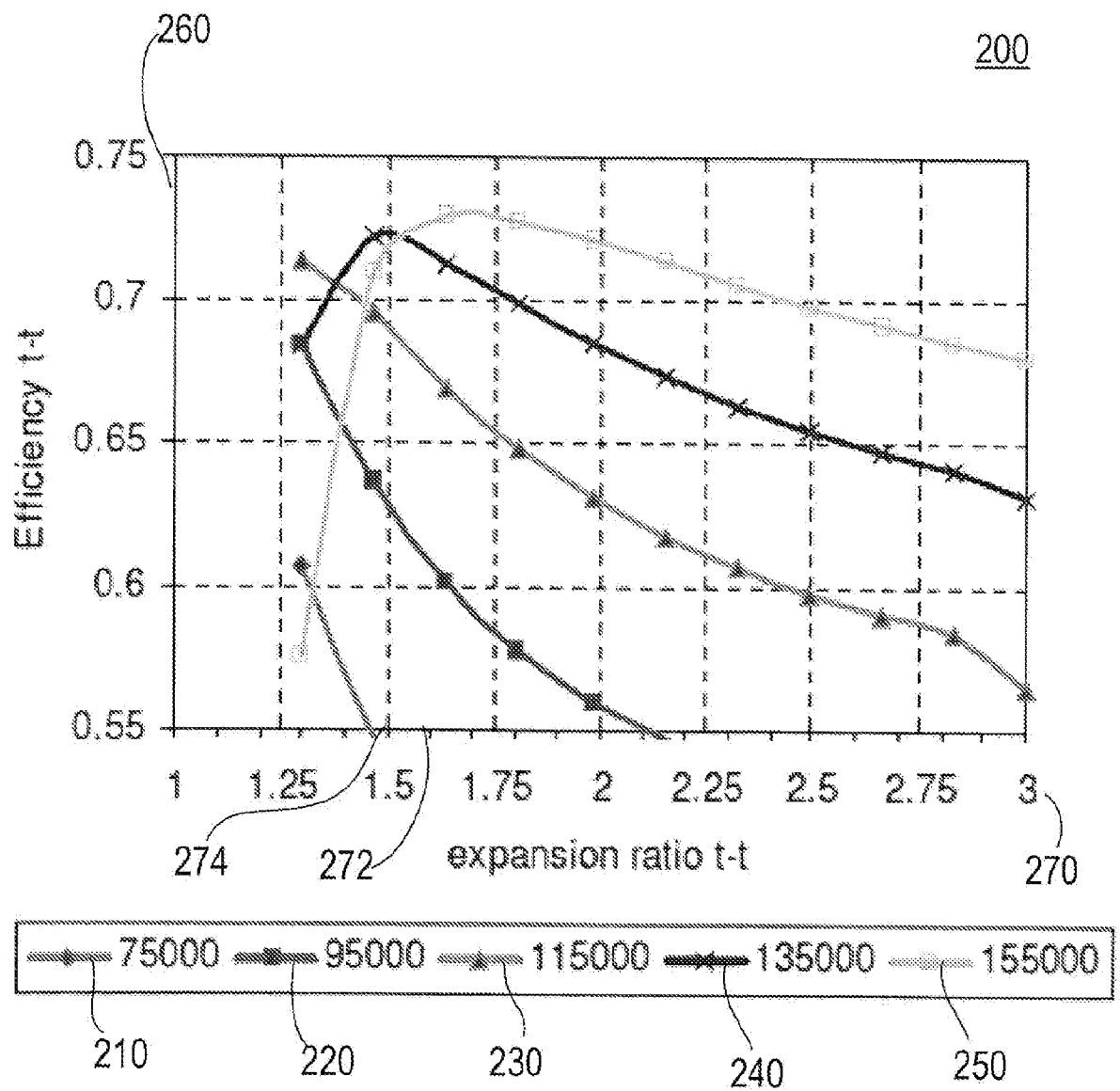
FIG. 3 shows a graph of Efficiency vs expansion ratio in a hypothetical known turbine design.

FIG. 3 is a graph 200 that shows the response of turbine efficiency 260 as a function of the expansion ratio 270 at different turbine operating speeds 210-250. Above a turbine expansion ratio of 1.6 272, the optimum rotational operating speed of the turbine is 155000 RPM (line 250). As the turbine expansion ratio decreases, a threshold (in this case the ratio of 1.6 shown at point 272) is reached where optimal efficiency is achieved at a speed below the design speed (and progressively lower as expansion ratio drops further, beyond the threshold). For example, in FIG. 3, at an expansion ratio of 1.5 (point 274), the optimum efficiency of the turbine is achieved at speed of 135000 RPM (line 240), not the design speed of 155000 RPM (line 250).

Figure 4:
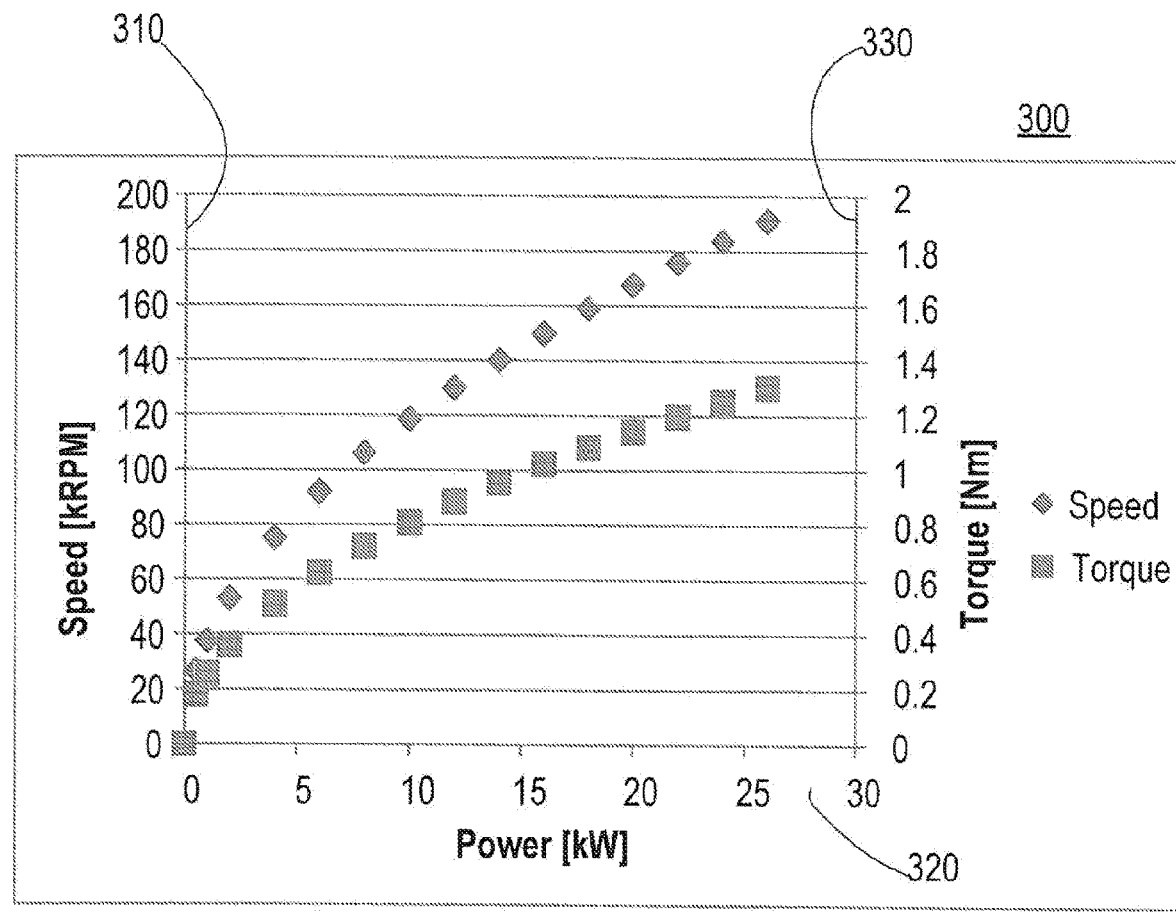
FIG. 4 is the typical known speed and torque response of a turbine under an aerodynamic load (eg a compressor)

FIG. 4 is a graph 300 that illustrates the form of the speed 310 vs. power 320 and torque 330 vs. power 320 of a turbine operating with a specific turbocompressor load. As described above, the characteristic that would best optimise turbine efficiency would be to operate at the design speed of the turbine across a broad range of input power levels (or, equivalently, across a broad range of expansion ratios). It can be seen that the relationship between the speed 310 of the turbine and the torque 330 of the turbine is broadly parabolic with increased power input 320. However, the form of the equation in FIG. 4, being parabolic, does not allow the design speed to be reached by the turbine at any but one input power level. Hence, turbine efficiency is rarely as high as it could be. Additionally, from FIGS. 3 and 4, it can be appreciated that if the torque load on the turbine shaft is variable (independently controlled), then the traditional link between speed and U/C is broken.

Figure 5:
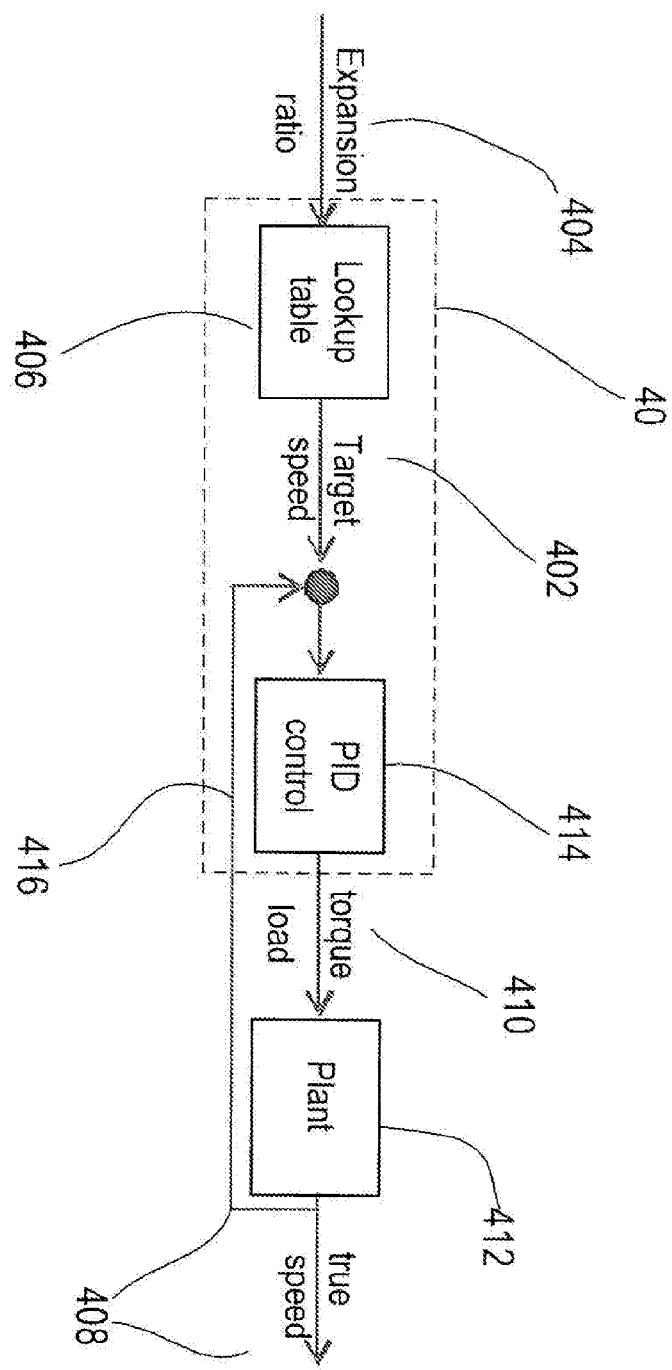
FIG. 5 is a control diagram according to the present invention.

Turning to FIG. 5, there is shown a block schematic including the controller 40 for the turbine 10. The controller 40 operates to control the amount of load supplied to the turbine 10 in such a way so as to extend the range of expansion ratios where the turbine 40 operates at or near its design speed.

To achieve this, the controller 40 calculates a speed target 402 based on the expansion ratio 404 or available input power, using an analyser, such as a lookup table 406. The lookup table 406 is based on simulations or test data, and is similar to FIG. 3 in the information it contains. Once this speed target 402 is known, the controller 40 attempts to reconcile actual turbine speed 408 with target turbine speed 402. A desired turbine or torque load 410 is the output of the controller 40, which is then applied to the variable load/generator 36 and delivered to the turbine 10.

The controller 40 determines the rotor field strength necessary for the generator 36 to provide the required torque load at the turbine shaft 14. As the generator 36 load varies, (for example increases) the torque load on the turbine shaft 14 also varies (increases) due to the change in armature reaction. This reduces the rotational speed of the turbine shaft 14 because more power is drawn from the turbine shaft 14 by the generator 36.

However, returning to FIG. 3, we can see that there are scenarios (dependent upon the expansion ratio) when a reduction in the rotational speed of the turbine is beneficial. Therefore, by knowing the expansion ratio 404 and with the use of a lookup table 406, the controller calculates a target speed 402 that provides the greatest efficiency of the turbine 10. This corresponds to a particular torque load 410 of the turbine shaft 14.

A plant (a combination of a process (tasks that transform inputs into outputs) and an actuator (in this case the variable load/motor windings/generator)) 412 both transforms the input required torque load 410 signal from the controller 40 into an output signal and supplies this signal to the motor windings 34. From the output of the plant 412, the true speed 408 of the turbine can be determined. A proportional-integral-derivative (PID) controller 414 is also used to calculate the error value between the true speed 408 and the set target speed 402 via a feedback input 416 to ensure that there is a smooth transition from one condition to another condition.

In general mechanical terms, the controller's 40 output is a torque load 410 which is applied to the turbine shaft 14. One example of such a load is the generator 36 of FIG. 1. In this embodiment, the output is a value of generator current which corresponds to the desired load torque (the transfer function of current to torque being a function of the generator's properties, especially the motor constant $k_m$). Insomuch as the generator 36 is reversible (capable of both positive and negative torque/positive and negative current), then the controller 40 functions in the same manner and is even further enabled to reach a target speed without delay. For example, by exciting the generator with a negative current, the generator can apply a torque to the turbine shaft 14, accelerating it rather than resisting it.

The effect of this controller 40 is to reduce the torque load 410 on the turbine 10 at lower expansion ratios (and lower amounts of available input power). This allows the turbine to operate at a higher speed (closer to the design speed), improving efficiency. This is illustrated by comparison between FIG. 4, and FIG. 6.

Figure 6:
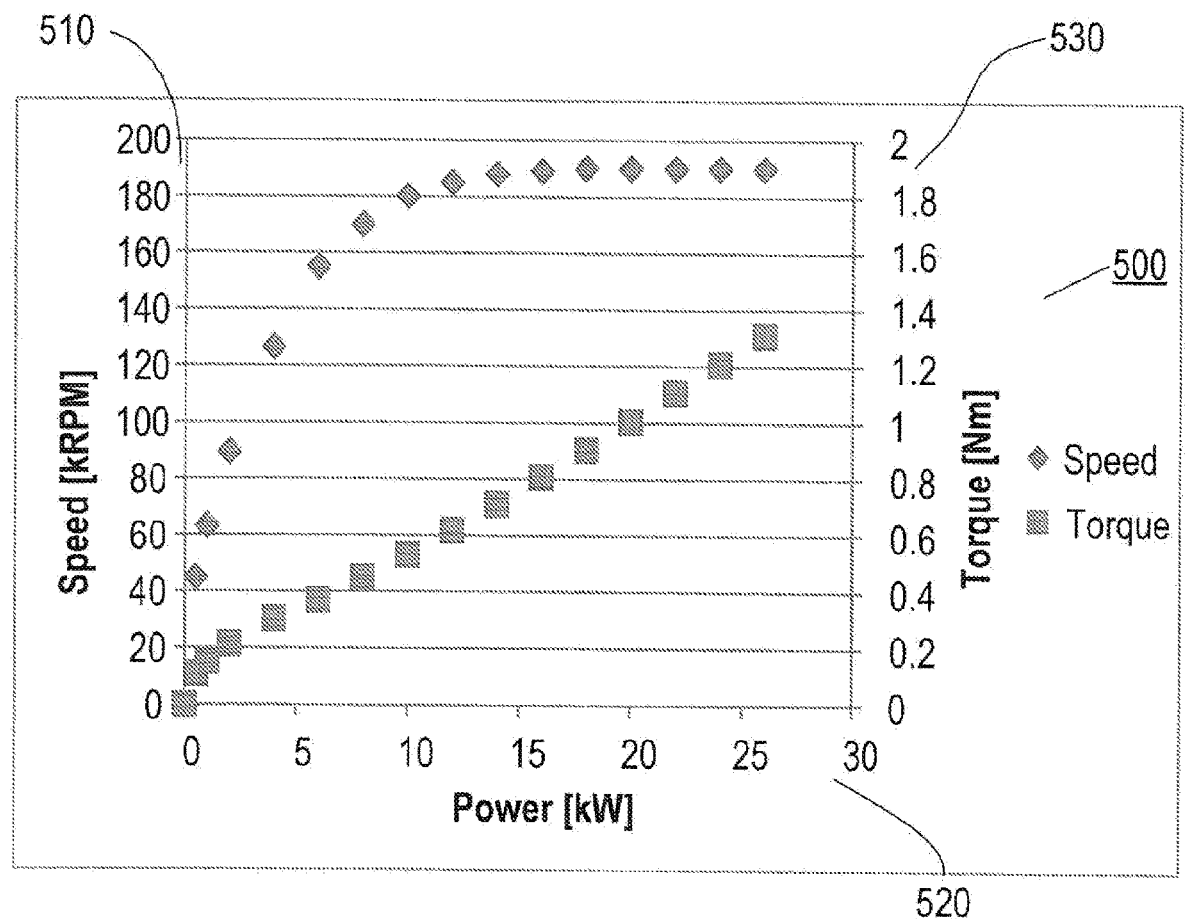
FIG. 6 is example speed and torque of a turbine under load for a turbine according to the present invention, allowing higher efficiency than standard.

FIG. 6 is a graph 500 that illustrates the form of the speed 510 vs. power 520 and torque 530 vs. power 520 of a turbine operating under a variable turbocompressor load controlled by the controller 40. In contrast to FIG. 4, where a compressor applies a typically constant load to the turbine shaft 14, in FIG. 6, the load on the turbine shaft is variable. This results in a more linear response between the torque and the power and a more logarithmic response of the speed in response to the power demand than the responses under a constant load shown in FIG. 4.

Rather than being constrained to a single operating speed that must then be synchronised to the constant load, resulting in the speed response of FIG. 4; at low operating speeds of the turbine 10, the torque requirement of the generator is reduced or even switched to negative to allow the turbine to quickly reach optimum design speed (in the case of FIGS. 4 and 6, 190 kRPM). Once the turbine shaft 14 reaches this design speed, the operating speed of the generator 36 can be synchronised to the design speed of the turbine shaft 14. A further increase in the torque applied to generator 36 then provides an almost linear increase in the power generated. Across a range of operation, this behaviour will produce higher efficiency and a shallower slope on the U/C curve.

Given the electric machine (motor/generator) 36 is capable of regulating the torque load 410 applied to a turbine shaft 14, the turbine 10 is then driven to operate in a best-efficiency condition for any given state of incoming gas. The optimal electric machine torque is calculated either directly or it can be calculated via an optimal speed target as described above.

Additionally, the turbine 10 and generator or electric machine 36 can also be connected to a compressor (not shown) by way of a common shaft or other direct coupling. In this case, the power consumed by the compressor is a function of speed (as well as other factors (such as the compressor pressure ratio, air density etc.). Thus, while the system can be tuned to optimise turbine efficiency, the better approach will be to operate the system as a whole with a compromise condition balancing between turbine performance (efficiency) and compressor performance (efficiency). Optimal compromises will not be discussed in detail here, but they depend largely upon the intake air pressure required by the engine.

In one embodiment, the controller 40 measures turbine true speed based on the voltage signal produced by the generator 36 coupled to the turbine shaft 14. The expansion ratio of the turbine 10 is also measured by stagnation pressure sensors 44 (see FIG. 1) placed in the flow path of the exhaust gas up-stream and down-stream of the turbine 10. By using a lookup table 406 stored within memory of the controller 40, the controller 40 determines the optimal running speed of the turbine 10. With this value, the controller 40 then calculates the current that should be passed through the generator stator as a component proportional to the difference of true speed 408 from optimal speed 402, a component proportional to this difference integrated over time, and a component proportional to this difference differentiated with respect to time (as shown in FIG. 5).

The calculated target current is then made to flow through the generator 36 by rectifying the generator output to direct current using a diode-type passive rectifier circuit, and then adjusting the duty cycle (percentage of time spent in the open condition) of an IGBT (insulated-gate bipolar transistor) or MOSFET (metal-oxide-semiconductor field-effect transistor) type switch operating on a fixed on-off cycle frequency. As the percentage of time that the switch spends open, within its fixed frequency on-off cycle, increases, more current flows from the generator 36 into a lower-voltage load (such as a battery or vehicle electrical bus). An inductor and capacitor harmonic circuit, tuned to the cycle frequency of the switching device, ensures that the current is relatively steady over time (despite the on-off operation of the switch), and a diode or low-side IGBT allows current to be drawn from a low-voltage contact when the switch is off. This type of regulating circuit is known as a PWM (Pulse Width Modulation) voltage divider. It's combination with a current sensor and a feedback controller to produce constant current with variable voltage input (corresponding to variable operating states of the generator, in this state), specifically to achieve stable control in very high speed electric machines, is one subject of applicants co-pending application WO2011161408.

Figure 7:
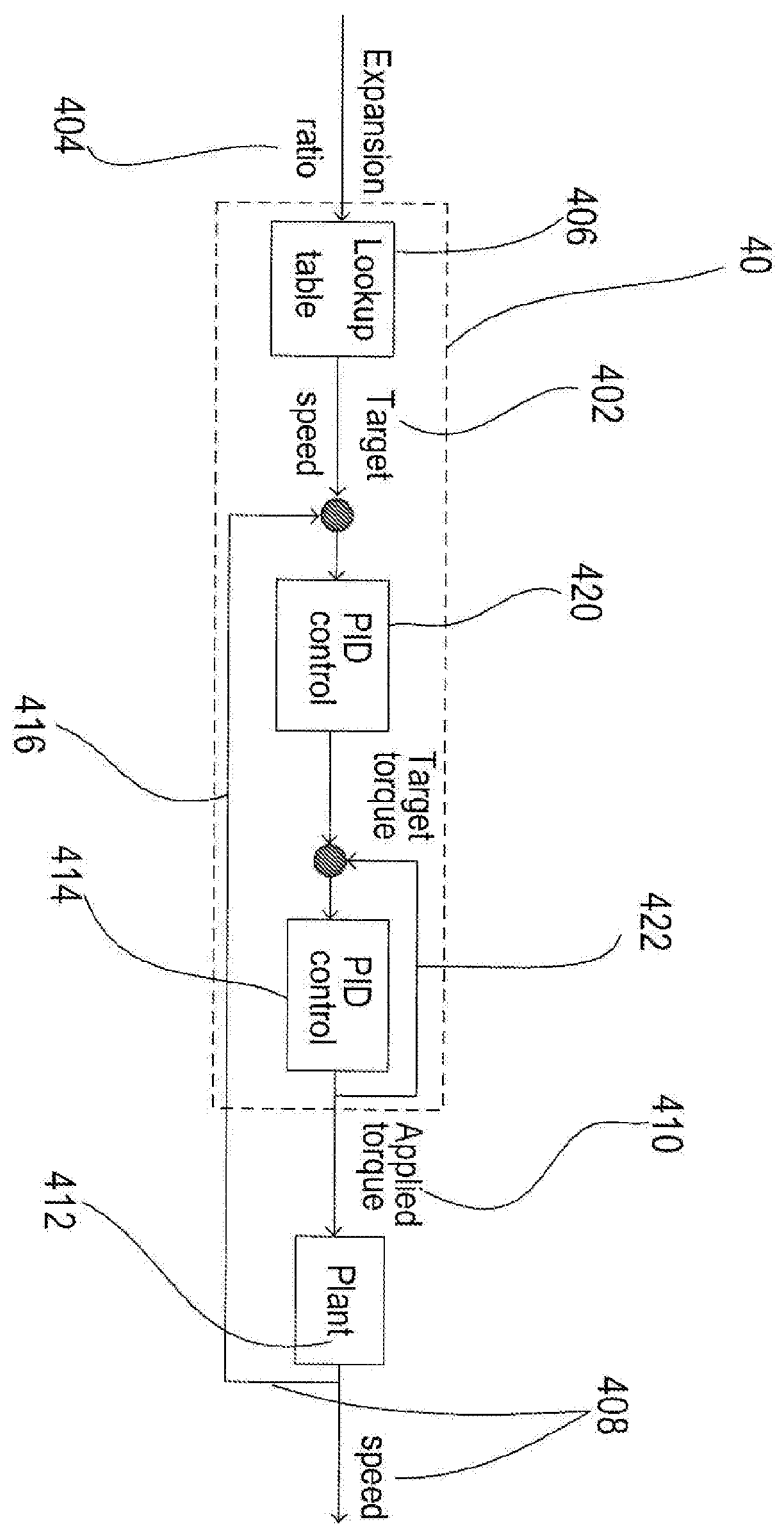
FIG. 7 is a control block diagram showing the use of second, embedded PID controller according to an alternative embodiment of the present invention.

Depending on the characteristics of the circuit and machine, the current passing through the controller 40 might be subject to large variations, even with constant switching duty cycle. If such large variations are present, a sensor is provided to detect the current produced by this circuit. This true current can be compared to the target current determined by the controller 40 above. In this embodiment, as shown in FIG. 7, where equivalent features have the same reference numerals as shown in FIG. 5, a secondary, embedded feedback controller 420, with its own PID architecture, operates to adjust the duty cycle 422 until the target current is achieved. Alternatively, if the current varies with a given duty cycle, but does so progressively and predictably as a function of generator speed, then a lookup table may suffice to determine the correct duty cycle for a given combination of target current and true speed.

Figure 8:
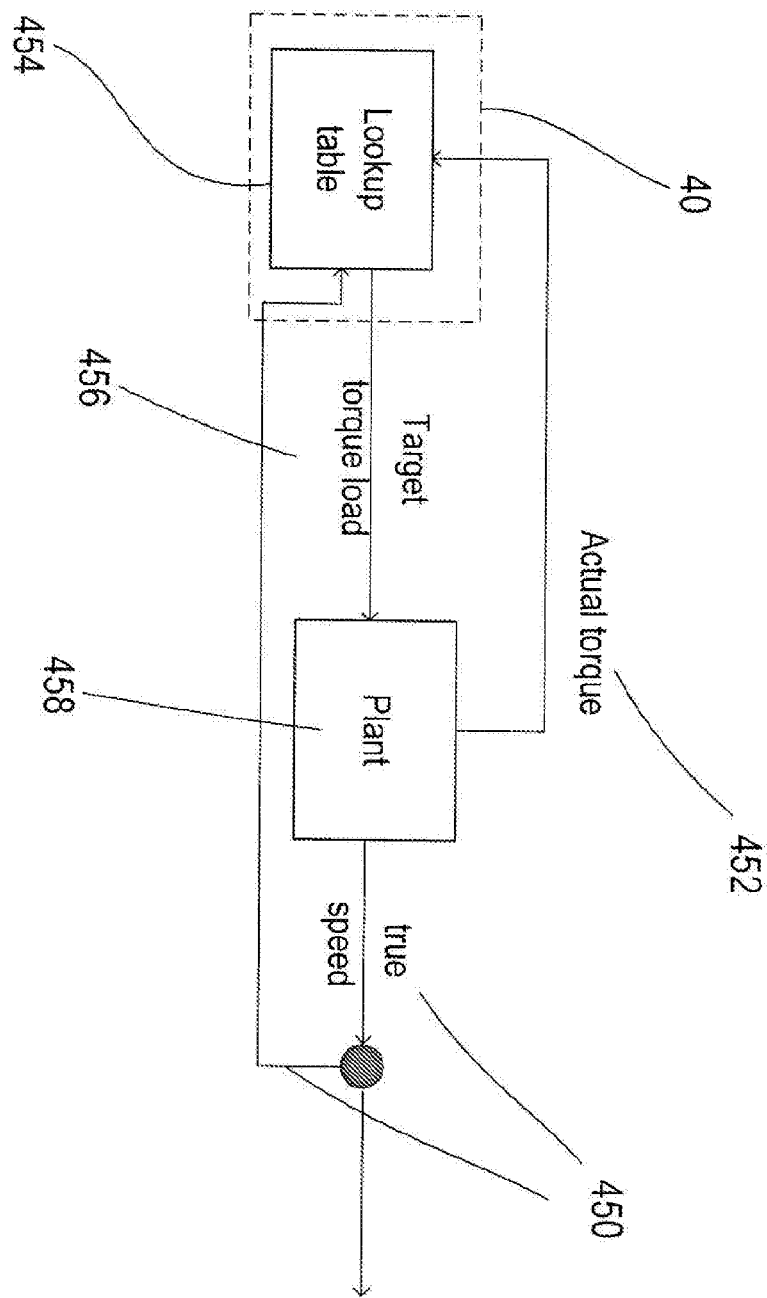
FIG. 8 is a control block diagram showing a controller according to a further alternative embodiment of the present invention.

In another embodiment of the controller 40, as shown in FIG. 8, the pressure ratio of the turbine 10 is not sensed directly. Instead, turbine power is calculated as the product of true speed 450 and actual torque 452 of the turbine. This torque 452 is calculated from the generator current measured by a secondary, embedded PID controller and the generator's inherent characteristics (which generally entail generator torque being directly proportional to generator current, as expressed by the motor constant, $k_m$). In this embodiment, pressure sensors are eliminated, potentially reducing the cost of the system. The calculated turbine torque 452 can be used directly, using a different lookup table 454 to the one described above, to choose the target torque load 456 and the optimal speed of the turbine 10 via plant 458. Alternatively, the expansion ratio could be calculated from the known turbine speed, the turbine power, and the turbine's efficiency map data (tested and provided separately in a lookup table).

Another implementation of the current regulating portion of the controller is an active rectifier. Such rectifiers are well known as having the dual functions of achieving DC output from AC input and also achieving a variable voltage drop. By combining the rectifier with a current sensor a constant current flow can be achieved. This allows its use in situations where the current passing through the generator is unstable (for example, with a low-impedance electric machine having a large range of operating speeds).

One such use of a turbine and the control system described above is in a forced induction system, such as a turbocharger. In particular, the turbine would be suited for use in a mechanically decoupled turbocharger such as described in the Applicants earlier patent GB 2444603.

The invention claimed is:

1. A turbine for extracting energy from a fluid flow, the turbine comprising:
   a housing;
   a turbine wheel rotatably coupled within the housing and rotatable, by an input power derived from a current fluid flow from an engine, to provide a rotational output;
   a variable load applying a load to the rotational output; and
   a controller configured to:
      receive information relating to a current expansion ratio of the turbine at the current fluid flow from sensors within the current fluid flow;
      determine a corrected operating velocity of the rotational output of the turbine wheel at the current expansion ratio to achieve a highest operating efficiency of the turbine wheel at the current fluid flow; and
      supply a signal to the variable load to vary the load applied to the rotational output of the turbine in response to said present operating conditions so that the turbine wheel rotates at the corrected operating velocity.

2. The turbine according to claim 1, wherein the variable load acts to accelerate the rotational output.

3. The turbine according to claim 1, wherein the variable load acts to brake the rotational output.

4. The turbine according to claim 1 wherein the variable load is applied to the rotational output by an electric machine.

5. The turbine according to claim 4, wherein the electric machine is a generator.

6. The turbine according to claim 5, wherein the variable load is a generator current that corresponds to a desired load torque of the rotational output.

7. The turbine according to claim 5, wherein the generator is a synchronous generator.

8. The turbine according to claim 6, wherein the controller includes a secondary PID controller to receive information of a value of a generator current and to calculate an actual torque of the rotational output from the value of the generator current.

9. The turbine according to claim 8, wherein the controller receives the calculated actual turbine torque and comprises a torque lookup table to calculate the current operating velocity and a value required for a variable load torque load so that the rotational output rotates at the corrected operating velocity.

10. The turbine according to claim 1, wherein the controller uses a lookup table to calculate the corrected operating velocity of the rotational output based on the current operating conditions of the turbine.

11. The turbine according claim 1, wherein the information relating to the current operating conditions of the turbine includes a current speed of the rotational output and/or a current torque of the rotational output.

12. The turbine according to claim 1, wherein the turbine comprises a turbine shaft and the rotational output is a rotational speed of the turbine shaft.

13. A controller for adjusting a speed of a turbine, the controller comprising:
- an input to receive information from sensors within a current fluid flow from an engine relating to a current expansion ratio of the turbine at the current fluid flow;
- an analyser to determine a corrected operating velocity of a rotational speed of the turbine at the current expansion ratio based on the information received by the input, the corrected rotational speed matching a highest operating efficiency of the turbine at the current fluid flow; and
- an output configured to supply a correction signal to the turbine, wherein the correction signal alters a variable load applied to the turbine to increase or decrease the rotational speed of the turbine to match the corrected operating velocity.

14. The controller according to claim 13, wherein the information relating to the current operating conditions of the turbine is an expansion ratio of the turbine.

15. The controller according to claim 13, wherein the information relating to the current operating conditions of the turbine is a value of the generator current.

16. The controller according to claim 13, wherein the controller uses a lookup table to calculate the correction signal based on the information received by the input.

17. The controller according claim 13, wherein the controller uses a PID controller to monitor the correction signal.

* * * * *